United States Patent [19]

Dickinson et al.

[11] 4,092,596

[45] May 30, 1978

[54] DATA TRANSMISSION AND RECEPTION SYSTEM

[76] Inventors: Robert V. C. Dickinson, 32 Debbie Pl., Berkeley Heights, N.J. 07922; Alan W. Entenman, 27 Beacon La., Hicksville, N.Y. 11801; Jans Kliphuis, 124 Southdown Rd., Huntington, N.Y. 11743

[21] Appl. No.: 676,558

[22] Filed: Apr. 13, 1976
(Under 37 CFR 1.47)

[51] Int. Cl.$^2$ .............................................. H04B 1/68
[52] U.S. Cl. ................................ 325/49; 179/15 BP; 325/329
[58] Field of Search ......................... 325/49, 50, 329; 179/15 BP; 343/177, 179

[56] References Cited
U.S. PATENT DOCUMENTS

| 2,778,877 | 1/1957 | Caruthers | 179/15 BP |
| 3,443,229 | 5/1969 | Becker | 325/49 |
| 3,649,914 | 3/1972 | De Jager | 325/49 |

Primary Examiner—Robert L. Griffin
Assistant Examiner—Marc E. Bookbinder
Attorney, Agent, or Firm—Donald P. Gillette

[57] ABSTRACT

A system including a data modem having transmitter and receiver sections. The modem transmitter includes a multi-level data encoding system, a stable carrier generator and a selected transmission frequency, and a double sideband suppressed carrier modulator to modulate the multi-level signals on the carrier. All filtering to shape the signals in the transmitter section is done prior to modulation and, in the receiver section, after demodulation. Signals from several modem transmitters, each occupying its own assigned band, are multiplexed with two pilot carriers spaced by a predetermined frequency difference. The modem receiver includes a circuit to separate one of the carriers from the received band and mix that carrier with signals in a limited part of the band to shift the frequency of signals in the limited part of the band to an intermediate frequency (IF) band. A desired signal can be selected by frequency-shifting the IF signals so that the carrier frequency of the desired signal is at zero. The frequency-shifting signal must be controlled to have the proper frequency and phase. Signals can be modulated on more than one axis of the transmitter carrier provided there is an exact reproduction of the carrier's phase for demodulation.

15 Claims, 6 Drawing Figures

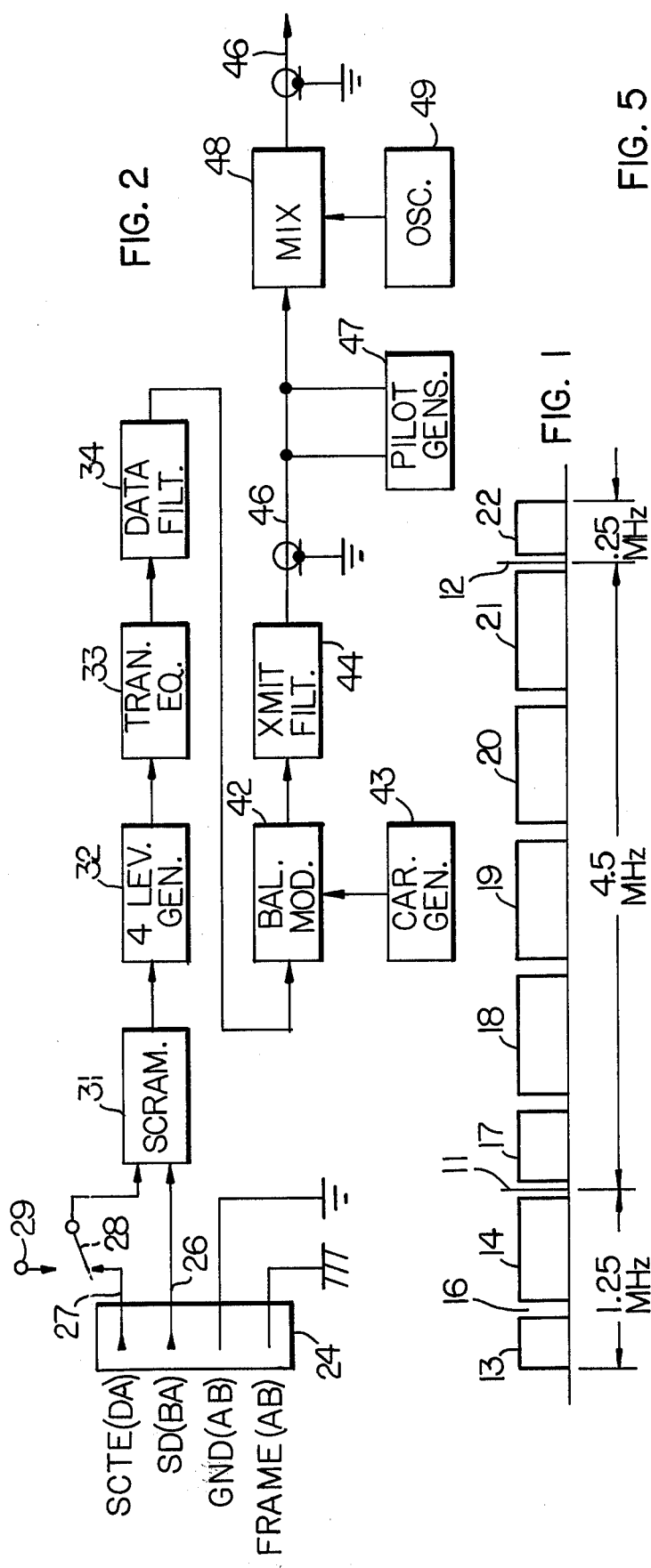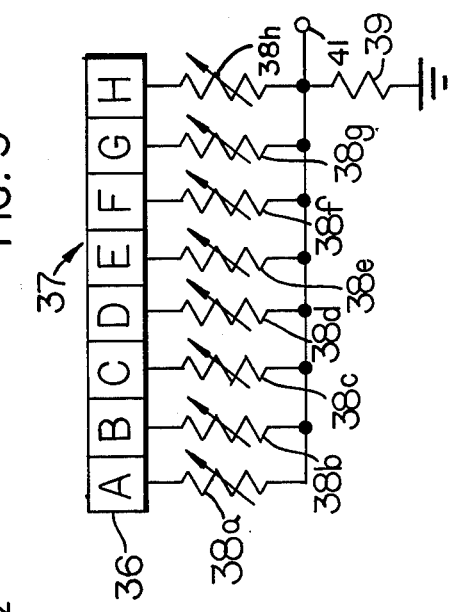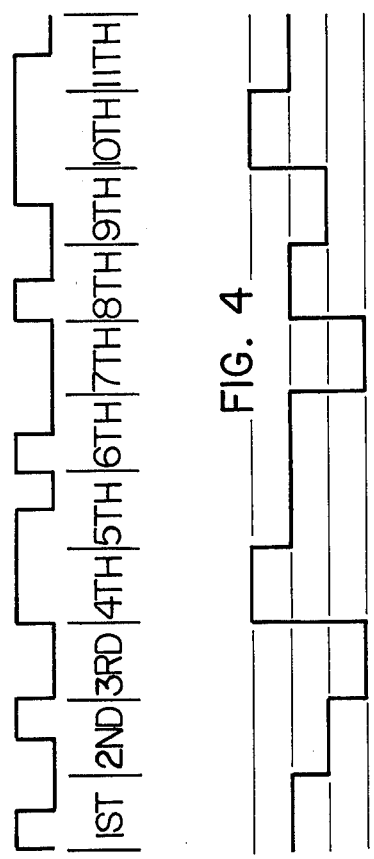

DATA TRANSMISSION AND RECEPTION SYSTEM

BACKGROUND OF THE INVENTION

1. Field of the Invention

This invention relates to the field of data modems, and particularly to modem arrangements for efficient use of frequency spectrum allocations in a closely packed transmission system, such as a cable television network.

2. The Prior Art

Most data modems in the past have been constructed for use in telephone systems with the bandwidth limitation normally imposed by television circuits. Other types of transmission media, such as the transmission and reception of radio waves do not have the same inherent limitations of bandwidth as telephone systems but generally lack control of the transmission path that is possible in a telephone system. A cable system arranged to transmit multiple broad band signals, such as television signals, is not inherently limited in bandwidth usage to the same extent as telephone systems but does have good control of the signal path between specific transmission and reception points.

Cable television systems have been installed in high density commercial and residential areas, and are quite suitable for commercial usage such as the transmission of data between branches of a bank or other corporation located at more than one point along a cable system and having a large volume of information that must be carried between the different branches or offices.

It is now recognized as being worthwhile to install a cable communication system entirely for commercial purposes, as opposed to the entertainment purpose originally considered to be the basic reason for cable television networks, in large manufacturing complexes. For example, chemical processing plants require the transmission of so much data for proper management and control that it is justifiable to install a cable television system for that purpose, alone.

Although wide band signals can be transmitted in a cable system, it is still necessary to make efficient use of the spectrum. This means that signals multiplexed together must be restricted to certain limited bands and that the frequency spectrum in these bands must not be wasted. In order to manage the transmission properly, it is desirable that signals be transmitted to a central station at one end of the cable and then retransmitted from that central station. To keep the signals flowing in one direction from interfering with those flowing in the other, the frequencies of incoming signals are shifted at the central station (referred to as the "head end"). This requires careful frequency control, not only to keep signals from one modem separate from another but also to control the signal of each modem so that it can be correctly demodulated.

SUMMARY OF THE INVENTION

In accordance with the present invention, a data modem is provided to receive pulse code modulated signals, prepare them by logical analysis and synthesis and by suitable filtering, and use them as modulating signals in a double sideband, suppressed carrier modulator to modulate a carrier having a specific frequency. The modulated signal with carrier suppressed is then applied to the transmission medium, such as a cable capable of accepting this signal and a large number of similar signals, each located at a specific section of an overall frequency band.

The signals received in their individual frequency slots at the head end have two pilot carriers at precisely controlled frequencies added to them. Because it is common for a cable system to be used to transmit television signals, it is convenient for these pilot carrier frequencies to be separated 4.5 MHz in the same way that the video and audio carriers of a television system are separated. Furthermore, the pilot carriers have specific frequencies in addition to the specific frequency difference between them.

Typically, equipment at the head end of the cable system shifts the band of frequencies of upstream signals, including the pilot carriers, to a higher frequency band and reapplies the higher frequency band of signals to the cable as downstream signals. Any of the downstream signals can theoretically be received in the receiving section of any modem connected to the cable system. However, it is common to maintain a specific relationship between two or more modems so that the signals generated at one will be received only at the other and will not be picked up or decoded by any other modem on the network.

The receiving section of each modem includes a filter to select the proper broad band channel. The output of the filter is applied to a first mixer, along with a local oscillator signal, to transfer the selected broad band to a first intermediate frequency band. The signals are further filtered to reject undesired signals and are amplified and applied to two other filters, one of which has a narrow pass band tuned to one of the two pilot signals. The other of the two filters transmits only approximately half of the broad band of signals received in the receiving section, this half being the half that does not include the selected pilot frequency. Thus, if the lower pilot frequency is selected, the half band filter selects the upper half of the broad band, and vice versa. The reproduced pilot signal is separated from the complete intermediate frequency band by a narrow band filter. It may then be used to control the automatic gain circuits but its main use as a carrier is to beat with those signals in the half of the intermediate frequency band that does not include the selected pilot signal. These half band signals, when mixed with the selected pilot, are converted to a second intermediate frequency band from which the specific data signal can be selected.

In order to select the specific data signal the remaining half band is applied to another mixer along with a carrier that has precisely the same frequency as the desired data signal and is in the same phase as the suppressed carrier of that data signal. This, in effect, demodulates the desired data signal at the output of the latter mixer by returning that data signal to its base band. Low pass filters can then separate out any undesired signals and can control the frequency response without the need to be concerned about frequency drifting, which would be difficult to control if the desired data signals were selected by extremely precise band pass filters at the radio frequency (RF) or intermediate frequencies of the receiver. Phase shift produced in such filters would also be a problem.

The exact phase of the demodulating carrier can be controlled in a circuit known as a Costas loop. The second IF signal is applied to yet another mixer that is also supplied with the carrier signal which is to be controlled. However, the latter carrier signal must be in quadrature with the carrier of the same frequency used to effect demodulation of the data signal. Filtered output signals from the two mixers controlled by this carrier source are multiplied together to generate a phase error signal. If there is no phase error, the output of the mixer supplied with the quadrature carrier signals will be zero. However, any drift from the proper phase condition will make the output of the latter mixer different from zero so that a non-zero phase error signal will be generated by the multiplier. This phase error signal is applied to the carrier source, which may be a voltage controlled oscillator.

After the desired data signals have been demodulated, they can be passed through suitable circuits to regenerate data signals of the proper form.

BRIEF DESCRIPTION OF THE DRAWINGS

FIG. 1 shows frequency allocation for data circuits in a cable television network.

FIG. 2 shows the transmitter section of a modem and some of the components of the head end of a cable television system.

FIG. 3 shows a typical data signal.

FIG. 4 shows a four level signal produced in the operation of the transmitter in FIG. 2.

FIG. 5 is a simplified version of a transversal equalizer in the transmitter of FIG. 2.

DESCRIPTION OF THE PREFERRED EMBODIMENTS

Figure 6:
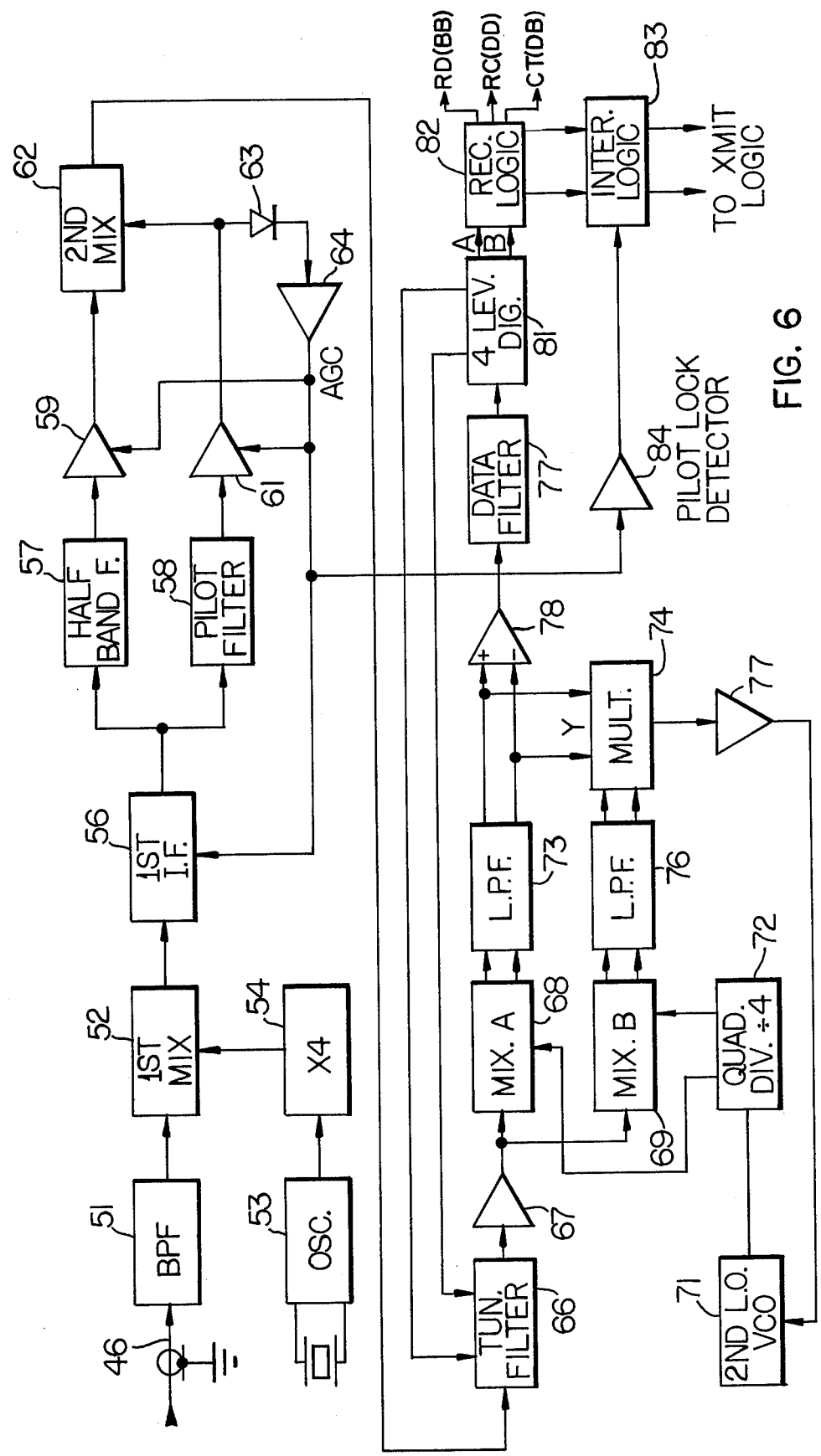
FIG. 6 is a block diagram of a receiver section of a data modem in accordance with this invention.

FIG. 1 shows a typical frequency allocation graph of data signals in a cable television newtork. The entire bandwidth available for data transmission is 6 MHz, the same as the bandwidth of a standard television signal. In addition, two pilot carriers 11 and 12 are provided in accordance with the present invention and are spaced 4.5 MHz apart, which is the same as the spacing between video and audio carriers of a television signal. Furthermore, the exact frequencies of the carriers 11 and 12 are controlled in accordance with an available channel that could otherwise be occuppied by a television signal in the cable television system.

It will be noted that the spectrum in FIG. 1 is divided into several blocks of limited bandwidths. There are two blocks 13 and 14 in the space of 1.25 MHz below the pilot carrier signal 11. This corresponds to the spectrum allocation for vestigial sideband operation, which is standard for television signals. The spectrum blocks 13 and 14 are spaced apart by a guard band 16 and may be used for the transmission of any signals that can be fitted into their available bandwidths. Between the carriers 11 and 12 are several more blocks of signal space indicated by reference numerals 17-21, and there is a further block 22 in a relatively narrow part of the spectrum above the carrier 12. The specific allocation of signals in the blocks 17-22, which are also separated from each other by guard bands, depends upon the requirements of the customers or users of the cable system. A proposed allocation allows four circuits for transmitting data at the rate of 230.4 kilobits per second (kBs) to be allocated to the block 18; 15 circuits capable of transmitting data at 50kBs to be allocated to the block 19; 30 circuits capable of transmitting data at 19.2kBs to be allocated to the block 20; and 20 circuits capable of transmitting data at 9.6kBs to be allocated to the block 21. The blocks 13 and 22 may remain unused. The block 14 may be used for special services and the block 17 for other services.

A cable system that is to carry information not only to the user but also from the user requires some separation between the two types of signals since the same cable carries the information in both directions. The separation is commonly made on the basis of frequency. Furthermore, it is expected that the entertainment signals carried on the same cable with data signals would be transmitted from a central station at one end of the cable. For proper control of the entire system, it is desirable that the signals that originate at the user's locations be transmitted in one frequency band to the head end of the cable and then retransmitted back along the cable in another band. More signals are expected to be transmitted from the head end of the cable downstream to the users than in the opposite direction. For example, the cable system may be capable of transmitting signals including both television and data signals over a relatively wide band from about 50 to 300 MHz; whereas data signals transmitted upstream from the users to the head end occupy only part of the spectrum below 50 MHz.

It is important in the handling of data signals to interfere as little as possible with the formats selected by the individual users. This allows the users to operate with different clocking frequencies and other factors and permits them to maintain secrecy of the information transmitted from one of their locations to another, even though such transmission is carried on the same cable with all of the other signals.

FIG. 2 shows a transmitter suitable for applying signals to the upstream frequency band of a cable television system. Such signals in the form of data are applied at an interface 24, such as a standard EIA 232C interface, which is capable of accepting standard data signals. The interface 24 includes standardized ground connections and a standard input terminal 26 to which the data signals themselves are applied. A clock signal may also be applied to a terminal 27. The latter is connected to one of the fixed contacts of a single-pole, double-throw switch 28 that can, alternatively, receive clock signals applied by way of a terminal 29. The latter may be connected, for example, to the receiver section of the complete data modem.

The clock signals and the data signals are typically applied to a logic section that may include a scrambler 31 that has, as one of its purposes, the rearrangement of incoming data signals so that the voltage, particularly of a non-return-to-zero signal, cannot remain at one of its two values, such as ± 5 volts, for an excessive length of time.

The output of the scrambler 31 is applied to another part of the transmitter logic section: a four level generator 32. Such generators are common in the data processing art, and they permit the required bandwidth for transmitting a data signal to be reduced. For example, if the output signal of the scrambler 31 is a two level signal as shown in FIG. 3, in which the voltage is always at one level or the other, the bandwidth required for transmission of this signal depends upon the maximum rate at which the signal can change from one of its values to the other and then back to the original value. In effect this is the same as saying that the bandwidth required to transmit a pulse signal, such as the data signal in FIG. 3, is a function of the number of bits, or pulses, of minimum duration that could be included in that signal in a given unit of time, such as one second.

As may be seen, there are several instances in the data signal in FIG. 3 where the voltage shifts from one value to the alternative value and back again in one unit of time, which corresponds to the maximum bit rate.

A typical four level generator 32 compares pairs of intervals of data signals of FIG. 3 and produces a signal that occupies, for the total duration of one pair of such signals, a single one of four possible values. For example, if the data signal in FIG. 3 in an adjacent pair of intervals has a low value in the first such interval and a low value in the second such interval, it may be referred to as a 0–0 signal and may cause the four level generator to produce an output signal at its first level. Similarly, if the value of the signal in FIG. 3 is low in the first of two adjacent intervals and high in the second of those intervals, it may be referred to as a 0–1 signal, and the four level generator may be arbitrarily caused to produce an output signal at its second level. In the same manner, a 1–0 signal in the data signal of FIG. 3 may produce a third level signal at the output of the four level generator 32, and a 1–1 signal may produce a signal at the fourth level. This type of signal encoding is known as di-Bit encoding.

The output signal of the four level generator is shown in FIG. 4 corresponding to the double intervals marked 1st through 11th in FIG. 3. In the first interval, the signal is a 1–0 signal corresponding to level 3. The second interval signal is a 0–1 signal corresponding to level 2. In a similar manner the third through eleventh intervals cause the output of the four level generator to go successively to levels 1, 4, 3, 3, 1, 3, 2, 4, and 3.

The four level signal produced in the generator 32 is applied to a filtering system that includes a transversal equalizer 33 and a data filter 34. The combined purpose of these filters is to predistort the waveform of the four level signal to compensate for distortion that will take place in other filters of the complete transmitter and receiver and in the cable head end circuits. The data filter 34 may be a standard analog filter, for example, a 9-pole filter with fixed components. However, it is difficult to get exact frequency and phase response correction by means of such a filter and the transversal equaliver is intended for that purpose.

FIG. 5 shows a simplified version of a transversal equalizer. The four level signal is applied through an input terminal 36 to a multi-position shift register 37. In this case the shift register has eight stages A–H. The four level signal applied to the terminal 36 is clocked through the entire shift register in the length of time that corresponds to the duration of one step of the four level signal. Thus each step is divided into eight intervals. Each section A–H has an output connected to a corresponding variable resistor 38A–38H. The other ends of these resistors are all connected together to one end of a resistor 39 and to an output terminal 41. Each of the resistors 38A–38H comprises part of a voltage divider of which the resistor 39 is the other part. This resistance network also serves to add signals from the stages A–H in the proportion determined by the voltage division ratio corresponding to each stage. As a result, the four level signal has the leading and lagging edge of each step, and even the level portion of each step modified in amplitude in the same manner as would be done by a filter. However, the effective frequency equalizer in FIG. 5 can be controlled by adjustment of the variable resistors 38A–38H much more easily than in a normal filter.

The output of the data filter 34 is applied to a circuit 42 that produces modulation with a suppressed carrier. Such a circuit may be, for example, a balanced modulator. A carrier generator 43, which may be a crystal oscillator, is connected to the modulator 42 to supply thereto a carrier having a specific frequency within the band of signals shown in FIG. 1, for example, the section 20. For example, the frequency of the generator 43 may be 10 MHz, and is typically at some frequency between 7 and 11.5 MHz. The output signal of the data filter 34, modulates the amplitude of the carrier to produce a double side band modulated signal, but the balanced modulator 42 suppresses the carrier itself so that no steady signal of fixed frequency is applied to the cable. Other transmitters in the system would have carrier generators tuned to other frequencies spaced apart so that their modulated side bands would not interfere with each other. In each case the carrier is suppressed.

The double side band suppressed carrier signal from the modulator is passed through a transmitting filter 44 and applied to the cable 46 along with the other signals from other transmitters that are not shown in FIG. 2. At some distance along the cable, the signals enter a central office, located at which is commonly known as the head end of the cable. In accordance with the present invention, pilot carrier generators 47 at the head end add the two pilot signals 11 and 12 (FIG. 1) to the incoming data signals. There may be a large number of data signals, but in any case, there are only two fixed frequency signals, and those are the pilot carrier signals 11 and 12. By being added to incoming signals as those signals reach the head end of the cable 46, the frequency relationship between the pilot carrier signals and each of the data signals is fixed.

In the head end, the incoming signals are converted to a suitable higher frequency band, for example, the band 246–252 MHz. This frequency conversion may take place in a mixer 48 by mixing the incoming signals with high frequency signals from an oscillator 49. The output signal at the high frequency, which has been assumed to be 246–252 MHz, is then applied to the cable 46 to travel downstream. For the sake of clarity the downstream operation of the cable is illustrated by placing a short section of the cable 46 on the right of the mixer 48 in FIG. 2.

FIG. 6 shows a receiver to be attached to the cable 46 to receive the downstream signals. In fact, it is to be expected that the transmitter in FIG. 2 and the receiver in FIG. 6 will be two sections of a single piece of equipment known as a modem, and it is only for purposes of clarity that they are illustrated in separate figures.

The radio frequency signals to be extracted from the cable 46 and the receiver pass through a band pass filter 51 which selects the band that includes all of the signals in FIG. 1. The selected signals, amplified to the extent necessary, are applied to a first mixer 52 to be mixed with a source of local oscillations. This source may include a crystal oscillator 53 and a multiplier 54. In this embodiment, the multiplier multiplies the frequency of the output signal of the oscillator 53 by four. The output signal of the mixer 52 occupies a first intermediate frequency band and is applied to a first intermediate frequency tuned amplifier 56. The band width of this amplifier must be sufficient to include all of the signals in the spectrum shown in FIG. 1, i.e. approximately 6 MHz.

The wide band output signals of the amplifier 56 are applied to two filters 57 and 58. The filter 57 transmits only approximately half of the 6 MHz band of signals applied to it. For example, in the frequency chart of FIG. 1, the filter 57 would pass all of the blocks 19–22 or the blocks 13, 14, 17 and 18. The other filter 58 is tuned to a specific pilot frequency, either the frequency occupied by the pilot 11 or that occupied by the pilot 12. These frequencies, of course, are in the band of frequencies of the IF amplifier 56 and are not at their original, relatively low frequency. The filter 58 eliminates, as much as possible, all signals except the pilot signal that does not pass through the filter 57. That is, if the filter 57 passes the blocks 19–22 along with the pilot 12 (FIG. 1), the filter 58 would pass only the pilot 11. On the other hand, if the filter 57 passes the blocks 13, 14, 17 and 18 and the pilot 11 (FIG. 1), the filter 58 would pass only the pilot 12.

The output signals of the filters 57 and 58 are amplified by the amplifiers 59 and 61, respectively, and are applied to a second mixer 62. The pilot that passes through the filter 58 acts like a local oscillator for the signals that pass through the filter 57 and which constitute about half of the total band of frequencies in the first IF amplifier 56. The output of the second mixer 62 therefore consists of the band of frequencies shifted to a second, lower IF band, typically of about 3 MHz bandwidth. Since both pilot carrier signals are combined with the data signals as the latter are received at the head end (FIG. 2), the frequency relationships among all of the signal components at that point remain fixed. Therefore, using the pilot carrier that passes through the filter 58 to mix with the half band of signals that passes through the filter 57 results in shifting each data signal to a precise frequency location in the second IF band. This greatly facilitates selection of a given data signal from the latter band.

The pilot signal that passes through the filter 58 is also applied through a rectifier 63 to an automatic gain control amplifier 64 that sends AGC signals to the amplifiers 56, 59 and 61.

The relatively low frequency IF signal from the second mixer 62 is applied through a tunable filter 66 and an amplifier 67 to two mixers 68 and 69. It is in these mixers that the final demodulation of the desired data signal takes place. This demodulation is accomplished by supplying signals of proper frequency and phase to the mixers 68 and 69. The required frequency is the frequency of the suppressed carrier of the desired data signal. It will be understood that there are other data signals present within the half band of the frequencies applied to the mixers 68 and 69, and these other data signals will also be shifted to new frequencies by operation of the mixers 68 and 69. However, only the desired data signal will be shifted to its base band, i.e. the band that the modulating signals occupied before being applied to the modulator 42 in FIG. 2.

In the embodiment shown, the signals applied to the mixers 68 and 69 are produced in a signal supply means 71, such as a synthesizer or a local oscillator in the form of a voltage controlled oscillator (VCO). The oscillations produced by the signal supply means 71 are four times the carrier frequency of the desired data signal. The signals from the signal supply means 71 are divided by 4 in a frequency divider 72. In addition, the divider 72 produces the signals at its two output terminals so that they are 90° out of phase. That is, there is a quadrature relationship between these signals. Thus signals applied from the divider 72 to the mixer 68 are supposed to be in phase with the carrier signal of the desired data signal if that carrier signal were present. Because of the quadrature relationship, the signal supplied by the divider 72 to the mixer 69 would then be 90° out of phase with respect to the suppressed carrier signal. The output signals of mixer 68 are applied to low pass filter 73 that filters out undesired data signals, leaving only the one that is at its base band. This signal is then applied to a multiplier 74 where it is designated just for convenience as the signal Y. The output signals of the mixer 69 are filtered by a low pass filter 76 that corresponds to the filter 73. The remaining filtered signal from the filter 76 is applied to the multiplier 74 as the signal X. The multiplier 74 multiplies the signal X by the signal Y and the product signal is amplified by an amplifier 77 and applied to the signal supply means 71 as a phase error signal. The polarity of this phase error signal is such as to shift the phase of the output signal of the signal supply means 71 to a condition such that the divided signal from the divider 72 to the mixer 69 is 90° out of phase with respect to the suppressed carrier of the desired data signal. When this phase condition is achieved, there is no output signal from the mixer 69 and therefore the signal X has a value of zero and so does the phase error signal.

The output signal of the filter 73 is amplified in an amplifier 78 and applied to a data filter 79. The filter 79 is a multi-pole filter with a bandwidth of 0.38 times the data rate. For example, the data rate may be 19.2kBs. The filter 73 would then have a bandwidth of about 7.3KHz. The standards used in allocating data signal channels in the allocation chart shown in FIG. 1 allow a frequency spacing of 19.2 KHz. Since the filter 79 limits any side band frequency based on the 19.2kBs signal to about 7.3 KHz, there is approximately a 4 KHz guard band between adjacent data signal channels.

The output signal of the filter 73 is applied to a four level digitizer 81 that restores the signal to its proper form. The output of the digitizer 81 is then applied to a receiver logic circuit 82 to restore the data signal to the proper form to be applied to other data handling apparatus. The receiver logic 82 is also connected to a logic circuit 83 that interconnects with the transmitter logic to control the operation of the transmitter section of a combined transmitter-receiver modem. A pilot detector amplifier is conected from the output of the AGC amplifier 64 to the logic circuit 83 to provide indication that the receiver has locked into a pilot signal.

The source 71 of converting signals applied to the mixers 68 and 69 is indicated as being a VCO with a quadrature divider 72 to provide the necessary quadrature relationship between the carrier signals. Since the source 71 requires a phase error control signal in this arrangement, the output of the mixer 69 is used to provide the necessary information. Ideally, when the phase of the source 71 is exactly correct, the mixer 69 provides no output signal, i.e. the signal X is zero. By controlling the phase of the carrier signals to the mixers 68 and 69 in a different way, the mixer 69, which operates in quadrature with respect to the mixer 68, may also recover its own information signal provided the carrier in the transmitter was modulated by two signals in quadrature. Quadrature modulation is well-known in color television practice in which the two chrominance signals are modulated in quadrature on one sub-carrier. In the case of a data modem, the ability to use the mixer 69 for a separate signal would make it possible to transmit twice as much information on the same band. In fact, it is not even necessary that the second signal through the mixer 69 be a data signal; it could be, for example, an audio signal. However, this depends on being able to control very precisely the phase of the carrier signals applied to the mixers 68 and 69. A still further advantage to be obtained by providing separate phase control of these carriers is that two modems on a cable network could be arranged to exchange data signals with each other.

What is claimed is:

1. A data transmission system comprising:
   a suppressed carrier modulator;
   means to connect said modulator to a data-based signal cource to receive modulating signals from said source;
   combining means to combine the modulated signal from said modulator with first and second pilot carrier signals having fixed frequencies separated by a fixed frequency difference;
   frequency conversion means connected to said combining means to shift the frequency band of said modulated signal and said pilot carrier signals without changing the frequency differences therebetween;
   receiver means to receive the frequency-shifted signals and convert them to a first intermediate frequency signal;
   filtering means to separate from the first intermediate frequency signal one of said pilot carrier signals and a band of frequencies that includes a selected suppressed carrier modulated signal modulated by a data signal;
   a mixer connected to said filtering means to receive said one pilot carrier signal and said band of frequencies to beat said band of frequencies with said one pilot carrier signal to convert said selected signal to a second intermediate frequency band;
   second and third mixers connected to receive signals in said second intermediate frequency band;
   signal supply means to supply to said second and third mixers local oscillator signals having a specific frequency and having a specific phase relation to demodulate said selected signals in said second intermediate frequency band;
   low pass filter means connected to said second mixer to shape the demodulated signal therefrom; and
   data signal output means connected to receive signals from said low pass filter means.

2. The system of claim 1 in which said data-based signal source comprises:
   a di-bit encoding means to produce a four level signal; and
   filter means to modify the waveform of said four level signal to form the data-based signal.

3. The system of claim 1 in which said data signal output means comprises data regenerating means to translate the demodulated, filtered signal to a predetermined data form.

4. The system of claim 1 comprising a crystal oscillator connected to said modulator to supply the carrier signal thereto to be suppressed carrier modulated.

5. The system of claim 1 comprising, in addition, a synthesizer comprising a highly stable, single frequency signal source at one of said pilot carrier signal frequencies.

6. The system of claim 1 in which said first and second pilot carrier signals are separated by a fixed frequency difference of 4.5MHz.

7. A data transmission system comprising:
   receiver means to receive signals comprising first and second pilot carrier signals and at least one selected suppressed carrier modulated signal modulated by a data-based signal;
   a first mixer connected to receive said first pilot carrier signal and a band of frequencies that includes said selected signal to beat said band of frequencies with said first pilot carrier to convert said selected signal to a signal in an intermediate frequency band;
   a second mixer means connected to receive said selected signal in said intermediate frequency band;
   signal supply means connected to said second mixer means to supply thereto a signal having a frequency corresponding to the suppressed carrier of said selected signal supplied to said second mixer to demodulate said selected signal; and
   low pass filter means connected to said second mixer means to shape the demodulated signal therefrom.

8. The system of claim 7 in which said receiver means comprises:
   a mixing circuit to receive signals including said selected signal in a frequency band that is high relative to said intermediate frequency;
   a local oscillator connected to said mixing circuit to convert the received signals including said selected signal to a relatively high frequency intermediate frequency band higher than said first-named intermediate frequency band; and
   means connecting said first mixer to said mixing circuit to receive the relatively hgih frequency intermediate frequency signal therefrom.

9. The system of claim 8 in which said means connecting said first mixer to said mixing circuit comprises filter means for separating from the remainder of the signal in said relatively high frequency intermediate frequency band said first pilot carrier signal and a sub-band of frequencies including said selected signal, whereby the separated first pilot carrier signal beats with signals in said sub-band to convert said selected signal to said first-named intermediate frequency band.

10. The system of claim 7 in which said signal supply means comprises a synthesizer to generate said demodulating signal.

11. The system of claim 7 in which said second mixer means comprises second and third mixers having inputs connected to said first mixer to receive signals in said intermediate frequency band, and said signal supply means comprises means to supply to said second and third mixers first and second demodulating carrier signals having a fixed frequency and having a predetermined phase difference.

12. The system of claim 11 in which said phase difference is 90°.

13. The system of claim 12 in which said fixed frequency is identical with the suppressed carrier frequency of said selected signal applied to said second and third mixers.

14. The system of claim 13 in which said low pass filter means comprises a first low pass filter connected to said second mixer and a second low pass filter connected to said third mixer, and said system comprises a multiplier connected to said first and second filters to multiply their output signals together, said multiplier being connected to said signal supply means to supply a phase error signal thereto as a function of the product of the multiplied signals to correct the phase of said signal supply means.

15. The system of claim 14 comprising, in addition, data regenerating means connected to said first low pass filter to translate the demodulated filtered signal therefrom to a predetermined data form.

* * * * *